United States Patent Office 2,719,161
Patented Sept. 27, 1955

2,719,161

PYRIDINE THIOSEMICARBAZONE

Robert Behnisch and Fritz Mietzsch, Wuppertal-Elberfeld, and Hans Schmidt, Wuppertal-Vohwinkel, Germany, assignors to Schenley Industries, Inc., New York, N. Y., a corporation of Delaware No Drawing. Application May 7, 1952,
Serial No. 286,636

4 Claims. (Cl. 260—294.8)

This invention relates, generally to novel organic compounds, useful because of their physiological activities, and, more particularly, it concerns the thiosemicarbazones of certain heterocyclic aromatic aldehydes.

It is known that certain aromatic aldehyde thiosemicarbazones, such as benzalthiosemicarbazone and 4-acetylaminobenzalthiosemicarbazone, are useful therapeutic agents against various pathogens, including *Staphylococcus aureus* and *Mycobacterium tuberculosis*. It is also known that the physiological activity of an individual number of this large class of compounds is not predictable, either qualitatively or quantitatively, based upon the present state of knowledge of this subject.

According to this invention it is now found that a group of novel isomeric pyridine aldehyde thiosemicarbazones are possessed of physiological activity that makes them exceptionally useful therapeutic agents in the treatment of tuberculosis. These new chemical compounds are represented by the formula:

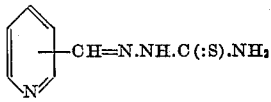

It will be noticed that the generalized formula above represents the three isomeric pyridine aldehyde thiosemicarbazones wherein the aldehyde group is at the 2-, 3- or 4-positions of the pyridine moiety.

The novel compounds of this invention can be readily prepared by reacting thiosemicarbazide with a selected one of the three isomeric pyridine aldehydes. This reaction is conducted in the manner usual for the preparation of aldehyde thiosemicarbazones and, preferably is performed in an acetic aqueous medium at an elevated temperature near the boiling point of the medium. Each of the three compounds of this invention, picolin-aldehyde thiosemicarbazone (pyridine-2-aldehyde thiosemicarbazone), nicotinaldehyde thiosemicarbazone (pyridine-3-aldehyde thiosemicarbazone) and isonicotinaldehyde thiosemicarbazone (pyridine-4-aldehyde thiosemicarbazone) is found to be a more effective agent against *M. tuberculosis* than the reference compound, 4-acetylaminobenzaldehyde thiosemicarbazone. In addition to being useful in combating tubercular infections, the compounds of this invention are also useful as pesticides.

This application is a continuation-in-part of applicants' co-pending application Serial No. 128,022, filed November 17, 1949, entitled "Products Of The Thiosemicarbazone Series."

In order to facilitate a better understanding of the subject matter of this invention and how the compounds of this invention may be prepared, several examples follow, provided by way of illustration merely and not by way of limitation upon the scope of this invention.

*Example 1*

Approximately equimolecular proportions of picolinaldehyde (2-formyl-pyridine) and thiosemicarbazide are reacted together in boiling dilute acetic acid. The reaction mixture is boiled under reflux for about one-half hour, then it is cooled and the yellowish colored crystals of picolinaldehyde thiosemicarbazone, which separate from the supernatant liquor, are removed, preferably by filtration, washed with water and dried. The product compound so obtained, picolinaldehyde thiosemicarbazone, has a melting point of 209° C. and is represented by the formula

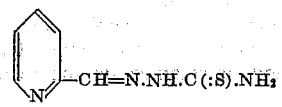

*Example 2*

About 10.7 g. of 3-formyl pyridine (nicotinaldehyde) and 9.5 g. of thiosemicarbazide are boiled for 30 minutes in a solution of 100 cc. of water to which has been added 5 cc. glacial acetic acid. The nicotinaldehyde thiosemicarbazone begins to separate as coarse, pale-yellow crystals even while the solution is still hot. These crystals are removed by filtration and dried. Their melting point is about 216° C., with decomposition. The product dissolves in dilute hydrochloric acid and in dilute sodium hydroxide solution, yielding a yellow solution, and it forms a copper complex salt which may be recovered as a greenish, yellow powder. This product, nicotinaldehyde thiosemicarbazone, is represented by the formula:

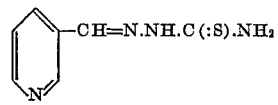

*Example 3*

Approximately 100 g. of isonicotinic acid hydrazide are dissolved in 500 cc. of pyridine and 140 g. of benzene sulfonyl chloride are slowly added to this solution. The mixture is stirred for several hours at 30°–40° C. Most of the pyridine is distilled off in vacuo and the residue is poured into water, whereupon N'-benzenesulfonyl isonicotinic acid hydrazide separates as coarse crystals, which melt at 148° C. after being recrystallized from water.

About 27.7 g. of this product are dissolved in 100 cc. ethylene glycol at a temperature of 155° C. and 25 g. of anhydrous potassium carbonate are stirred into the solution within a period of about 3 minutes. The gaseous products evolved are passed, for washing, into 300 cc. of cooled water in order to recover any isonicotinaldehyde which may be contained therein. After the initial almost-violent reaction has taken place, the 300 cc. of wash water are poured into the reaction mixture, 10 g. of thiosemicarbazide are added, and the solution is acidified by addition of acetic acid. The mixture is boiled for 30 minutes, then allowed to cool, and after standing for several hours, the crystalline deposit which forms is removed by filtration and washed with water. It is dissolved in boiling dilute hydrochloric acid (1%), the solution is purified with animal charcoal, filtered, and a sodium acetate solution is then added to the hot filtrate. The product, isonicotinaldehyde thiosemicarbazone precipitates as coarse yellow crystals which melt at 226°–228° C., with decomposition. The product may be recrystallized from dilute ethanol or water: if it is recrystallized from water, it is sometimes obtained as nearly colorless needles that collect in rosettes which, when heated decompose at a temperature of 226°–228°

C. The compound dissolves in sodium hydroxide solution and in hydrochloric acid to yield a yellow solution, and it forms a greenish-yellow copper complex salt. The product is represented by the formula:

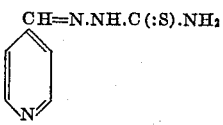

This product may also be prepared by reacting isonicotinic aldehyde with thiosemicarbazide in boiling dilute acetic acid in the manner described in the preceding examples. The product so obtained is identical with that hereinabove described.

Having thus described the subject matter of this invention, what it is desired to secure by Letter Patent is:

1. A compound represented by the formula:

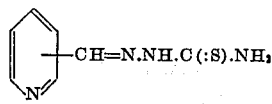

2. The thiosemicarbazone of 2-pyridine aldehyde having the following formula:

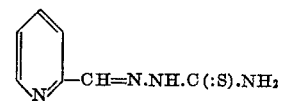

3. The thiosemicarbazone of 3-pyridine aldehyde having the following formula:

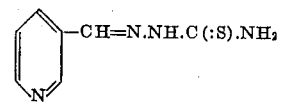

4. The thiosemicarbazone of 4-pyridine aldehyde having the following formula:

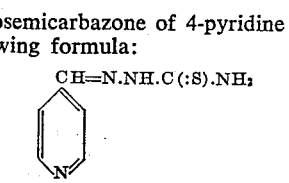

No references cited.